(12) United States Patent
Jeong et al.

(10) Patent No.: US 11,924,894 B2
(45) Date of Patent: Mar. 5, 2024

(54) ELECTRONIC DEVICE CONNECTED TO EXTERNAL ELECTRONIC DEVICE THROUGH WIRELESS COMMUNICATION CHANNEL BY USING TDLS SESSION DEFINED BY IEEE 802.11 STANDARD

(71) Applicant: Samsung Electronics Co., Ltd., Gyeonggi-do (KR)

(72) Inventors: Kiyeong Jeong, Gyeonggi-do (KR); Chounjong Nam, Gyeonggi-do (KR); Jihoon Sung, Gyeonggi-do (KR); Heeseok Ahn, Gyeonggi-do (KR); Sunkee Lee, Gyeonggi-do (KR); Insick Jung, Gyeonggi-do (KR); Junyeop Jung, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 497 days.

(21) Appl. No.: 17/291,053

(22) PCT Filed: Aug. 7, 2019

(86) PCT No.: PCT/KR2019/009920
§ 371 (c)(1),
(2) Date: May 4, 2021

(87) PCT Pub. No.: WO2020/101147
PCT Pub. Date: May 22, 2020

(65) Prior Publication Data
US 2021/0392705 A1 Dec. 16, 2021

(30) Foreign Application Priority Data
Nov. 12, 2018 (KR) .................. 10-2018-0138338

(51) Int. Cl.
*H04W 4/00* (2018.01)
*H04W 76/12* (2018.01)
(Continued)

(52) U.S. Cl.
CPC ........... *H04W 76/12* (2018.02); *H04W 76/14* (2018.02); *H04W 84/12* (2013.01)

(58) Field of Classification Search
CPC ...... H04W 72/04; H04W 72/40; H04W 72/50
See application file for complete search history.

(56) References Cited

U.S. PATENT DOCUMENTS 9,232,361 B2 * 1/2016 Calcev .................. H04L 12/189
9,736,871 B2 * 8/2017 Kim ...................... H04W 72/23
(Continued)

FOREIGN PATENT DOCUMENTS

KR 10-2011-0003370 A 1/2011
KR 10-2014-0043147 A 4/2014
(Continued)

OTHER PUBLICATIONS

European Search Report dated Nov. 9, 2021.
(Continued)

*Primary Examiner* — Shantell L Heiber
(74) *Attorney, Agent, or Firm* — Cha & Reiter, LLC

(57) ABSTRACT

An electronic device according to various embodiments comprises: at least one wireless communication circuit configured to transmit and receive wireless signals according to IEEE 802.11 standard; a processor operatively connected to the wireless communication circuit; and a memory operatively connected to the processor, wherein the memory can store instructions allowing, when executed, the processor to: receive a first request message for a tunneled direct link setup (TDLS) session defined by the IEEE 802.11 standard from a first access point (AP) through the wireless commu- (Continued)

nication circuit; determine, on the basis of the first request message, that an external electronic device having requested the TDLS session is connected to a second AP; establish a connection to the second AP through the wireless communication circuit on the basis of the determination; transmit a second request message for the TDLS session to the second AP; and establish the TDLS session with the external electronic device through the second AP on the basis of the reception of a response message to the second request message from the external electronic device. Additional various embodiments are possible.

15 Claims, 6 Drawing Sheets

(51) Int. Cl.
*H04W 76/14* (2018.01)
*H04W 84/12* (2009.01)

(56) References Cited

U.S. PATENT DOCUMENTS

| | | | |
|---|---|---|---|
| 9,913,307 | B2 | 3/2018 | Kandagadla |
| 2011/0051678 | A1* | 3/2011 | Tang .................... H04W 76/14 370/329 |
| 2011/0103264 | A1 | 5/2011 | Wentink |
| 2013/0166759 | A1 | 6/2013 | Rajamani et al. |
| 2013/0176903 | A1 | 7/2013 | Bijwe |
| 2013/0201866 | A1* | 8/2013 | Wentink ................ H04W 76/14 370/329 |
| 2014/0003293 | A1* | 1/2014 | Borges .................. H04W 76/14 370/255 |
| 2014/0029555 | A1 | 1/2014 | Seok |
| 2015/0139156 | A1 | 5/2015 | Thakur et al. |
| 2015/0163769 | A1* | 6/2015 | Lee ....................... H04W 24/02 370/329 |
| 2018/0198873 | A1 | 7/2018 | Qi et al. |

FOREIGN PATENT DOCUMENTS

| | | |
|---|---|---|
| KR | 10-2014-0107535 A | 9/2014 |
| KR | 10-2014-0116900 A | 10/2014 |
| WO | 2011/056878 A1 | 5/2011 |

OTHER PUBLICATIONS

Michael Montemurro; "TDLS peer discovery", IEEE 802.11-09/1218r4, Nov. 18, 2009; 10 pages.
Korean Decision to Grant dated Oct. 12, 2022.
European NOA dated Nov. 23, 2022.

* cited by examiner

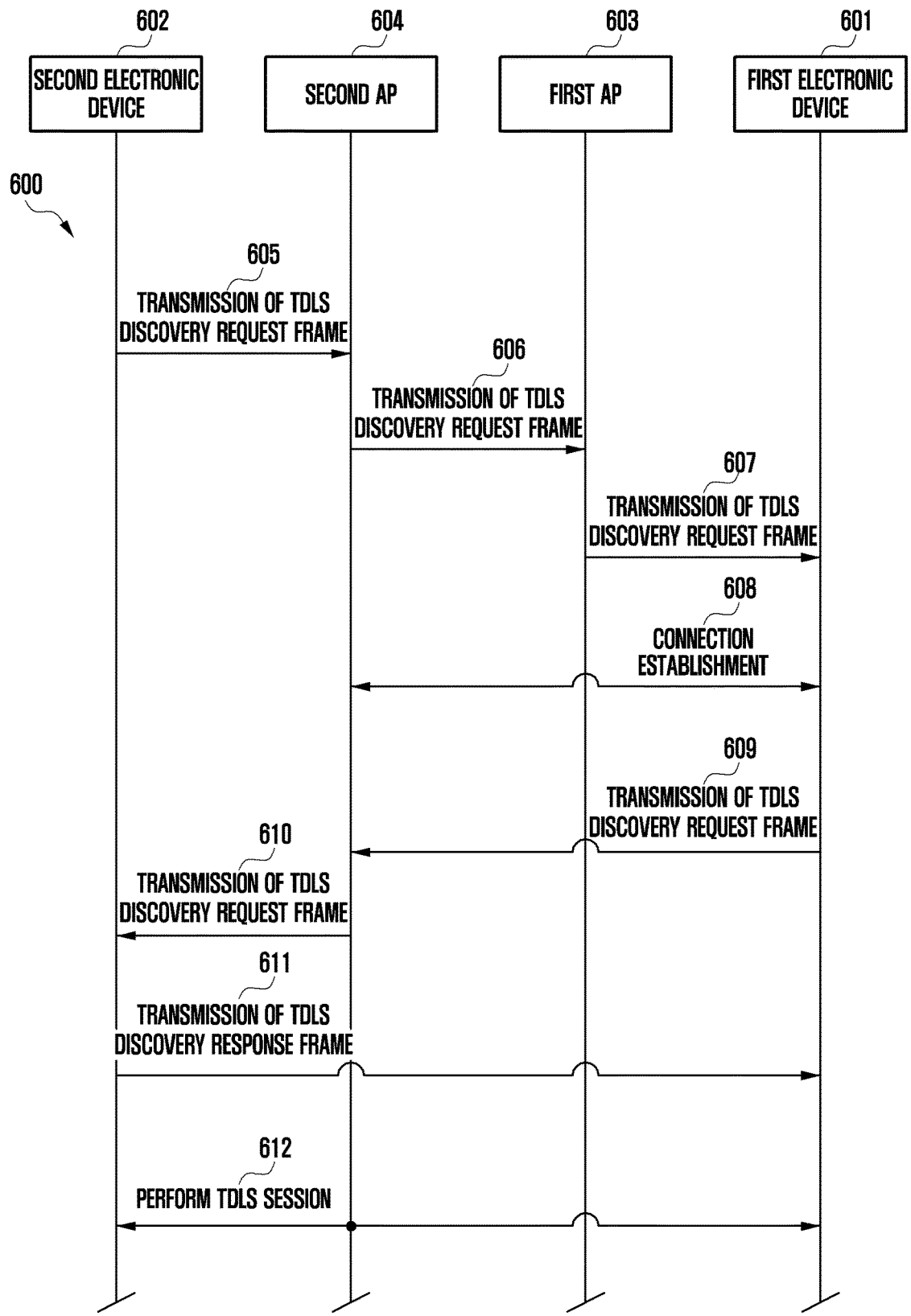

ELECTRONIC DEVICE CONNECTED TO EXTERNAL ELECTRONIC DEVICE THROUGH WIRELESS COMMUNICATION CHANNEL BY USING TDLS SESSION DEFINED BY IEEE 802.11 STANDARD

CROSS REFERENCE TO RELATED APPLICATIONS

This application is a National Phase Entry of PCT International Application No. PCT/KR2019/009920, which was filed on Aug. 7, 2019, and claims a priority to Korean Patent Application No. 10-2018-0138338, which was filed on Nov. 12, 2018, the contents of which are incorporated herein by reference.

TECHNICAL FIELD

Various embodiments of the disclosure relate to a technology allowing electronic devices (e.g., stations) to directly connect to each other in a wireless local area network (WLAN) according to IEEE 802.11 standards.

BACKGROUND ART

Direct connection (e.g., a tunneled direct link setup (TDLS) according to IEEE 802.11z standards) may be used to support data transmission or reception between electronic devices supporting a WLAN. For example, a TDLS session may allow an electronic device to directly exchange data with another external electronic device, or to directly obtain services therefrom.

DISCLOSURE OF THE INVENTION

Technical Problem

According to IEEE 802.11z standards, electronic devices are required to be previously connected to the same access point (AP) so that a TDLS session is performed between the electronic devices. For example, the electronic devices may establish a TDLS session through the same AP in a state where the same basic service set identifier (BSSID) is assigned to each of the electronic devices, and thereafter, may transmit or receive data through a wireless communication channel without involvement of the AP.

Some APs may each have multiple BSSIDs, and accordingly, a TDLS session may be impossible between electronic devices connected to the same AP. For example, even if a TV and a portable electronic device (e.g., smartphone) in a living room are connected to the same AP, when the TV is connected to the AP by using a first BSSID, and the portable electronic device is connected to the AP by using a second BSSID, the two electronic devices are unable to establish a TDLS session because they are using different BSSIDs.

In addition, in a case where there are multiple APs within a close distance, and electronic devices are connected to different APs, respectively, the electronic devices are unable to establish a TDLS session even if they are close to each other.

Various embodiments of the disclosure may provide an electronic device configured to perform a TDLS session with an external electronic device while following IEEE 802.11 standards in a WLAN supporting multiple BSSIDs.

Solution to Problem

An electronic device according to various embodiment may include: at least one wireless communication circuit configured to transmit or receive a wireless signal according to IEEE 802.11 standards; a processor operatively connected to the wireless communication circuit; and a memory operatively connected to the processor, wherein the memory stores instructions which, when executed, cause the processor to: receive a first request message for a tunneled direct link setup (TDLS) session defined by IEEE 802.11 standards, from a first access point (AP) through the wireless communication circuit; based on the first request message, determine that an external electronic device that has requested the TDLS session is connected to a second AP; based on the determination, establish a connection with the second AP through the wireless communication circuit; transmit a second request message for the TDLS session to the second AP; and based on reception of a response message on the second request message from the external electronic device, establish the TDLS session with the external electronic device through the second AP.

A method for operating an electronic device according to various embodiments may include: receiving a first request message for a tunneled direct link setup (TDLS) session defined by IEEE 802.11 standards, from a first access point (AP); based on the first request message, determining that an external electronic device that has requested the TDLS session is connected to a second AP; based on the determination, establishing a connection with the second AP through a wireless communication channel; transmitting a second request message for the TDLS session with the external electronic device to the second AP; and based on reception of a response message on the second request message from the external electronic device, establishing the TDLS session with the external electronic device through the second AP.

An electronic device according to various embodiments may include: at least one wireless communication circuit configured to transmit or receive a wireless signal according to IEEE 802.11 standards; and a processor operatively connected to the wireless communication circuit and configured to transmit or receive data to or from another electronic device through the wireless communication circuit, wherein the processor is configured to: establish a connection with an access point (AP) through the wireless communication circuit by using a first basic service set identifier (BSSID) of the AP; receive a first direct connection request message of an external electronic device through the AP; based on the first direct connection request message, determine that connection between the external electronic device and the AP is based on a second BSSID of the AP; based on the determination, establish a connection with the AP through the wireless communication circuit by using the second BSSID; transmit a second direct connection request message to the external electronic device through the AP; in response to reception of a response message on the second direct connection request message from the external electronic device, establish a connection with the external electronic device; and transmit or receive data to or from the external electronic device without going through the AP.

Advantageous Effects of Invention

According to various embodiments of the disclosure, an electronic device can perform data transmission or reception through a TDLS session with an external electronic device connected to an AP having multiple BSSIDs.

According to various embodiments of the disclosure, an electronic device connected to a first AP can perform data transmission or reception through a TDLS session with an external electronic device connected to a second AP.

BRIEF DESCRIPTION OF DRAWINGS

FIG. 6 illustrates operations for establishing a TDLS session in a WLAN according to various embodiments of the disclosure.

MODE FOR THE INVENTION

Figure 1:
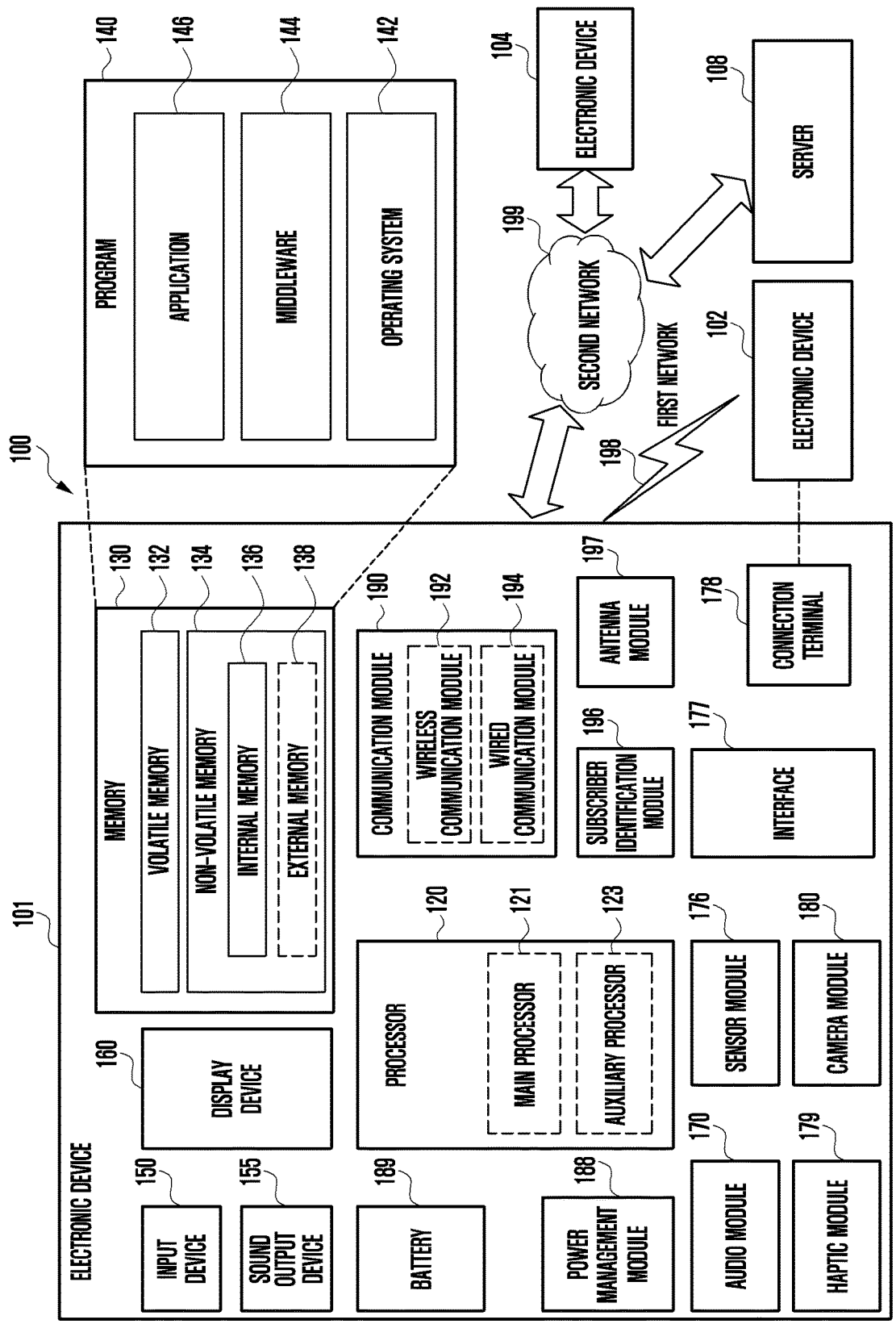
FIG. 1 illustrates an electronic device in a network environment in various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
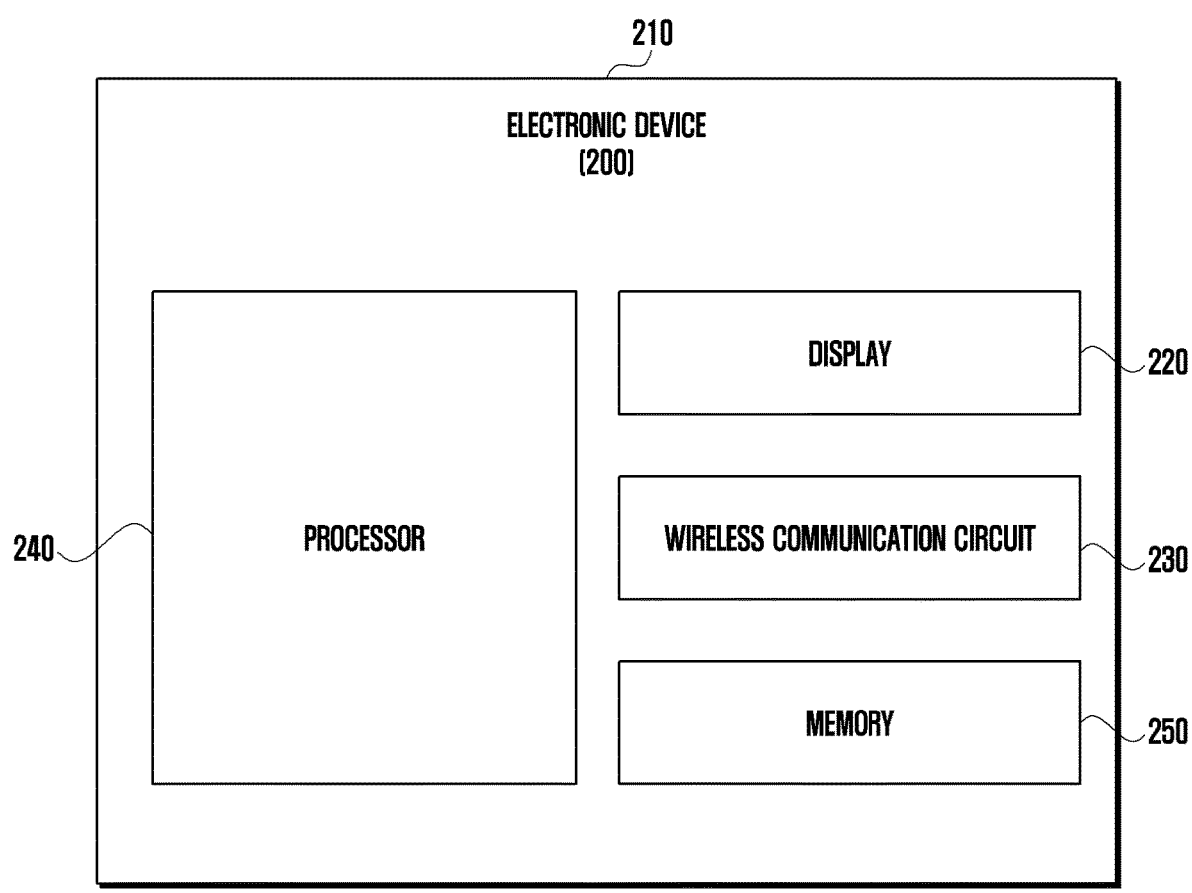
FIG. 2 illustrates an electronic device according to various embodiments of the disclosure, configured to directly connect to an external electronic device.

FIG. 2 illustrates an electronic device 200 according to various embodiments of the disclosure, configured to directly connect to an external electronic device. Referring to FIG. 2, the electronic device 200 (e.g., the electronic device 101 in FIG. 1) may include a housing 210, a display 220, a wireless communication circuit 230, a processor 240, or a memory 250.

According to various embodiments, the display 220 (e.g., the display device 160 in FIG. 1) may be visually exposed through a part of the housing 210. The wireless communication circuit 230 (e.g., the wireless communication module 192 in FIG. 1) may be positioned in the housing 210, and may be configured to transmit or receive a wireless signal according to IEEE 802.11 standards through wireless media (in other words, a wireless communication channel) (e.g., a wireless communication channel within a 2.4 GHz band or a 5 GHz band). The processor 240 (e.g., the processor 120 in FIG. 1) may be positioned in the housing 210, and may be operatively connected to the display 220 and the wireless communication circuit 230. The memory 250 (e.g., the memory 130 in FIG. 1) may be positioned in the housing 210, may be operatively connected to the processor 240, and may be configured to store instructions to be executed by the processor 240, data to be transmitted to the outside through the wireless communication circuit 230, or data received from the outside through the wireless communication circuit 230.

According to various embodiments, the processor 240 may transmit or receive data to or from a first external electronic device (e.g., an access point (AP)) through the wireless communication circuit 230 to establish a connection with the first external electronic device. The processor 240 may receive a direct connection request message of a second external electronic device (e.g., the electronic device 102 in FIG. 1) from the first external electronic device through the wireless communication circuit 230. For example, the direct connection request message may include a tunneled direct link setup (TDLS) discovery request frame defined by IEEE 802.11z standards. The processor 240 may identify, from the direct connection request message, identification information of a device connected to the second external electronic device through a wireless medium. The processor 240 may recognize, through the identified identification information, that the device connected to the second external electronic device is another device (e.g., a third external electronic device) rather than the first external electronic device, and accordingly, may perform a process of establishing a connection with the third external electronic device through the wireless communication circuit 230. After completing a connection with the third external electronic device, the processor 240 may transmit (broadcast) a message requesting a direct connection to the second external electronic device through the wireless communication circuit 230. The processor 240 may perform a session (e.g., a TDLS process) for directly transmitting or receiving data to or from the second external electronic device, through the wireless communication circuit 230, based on reception of a direct connection response message (e.g., a TDLS discovery response frame) through the wireless communication circuit 230. After the session is established, the processor 240 may perform data transmission or reception with the second external electronic device through the wireless communication circuit 230 without going through the third external electronic device.

Figure 3:
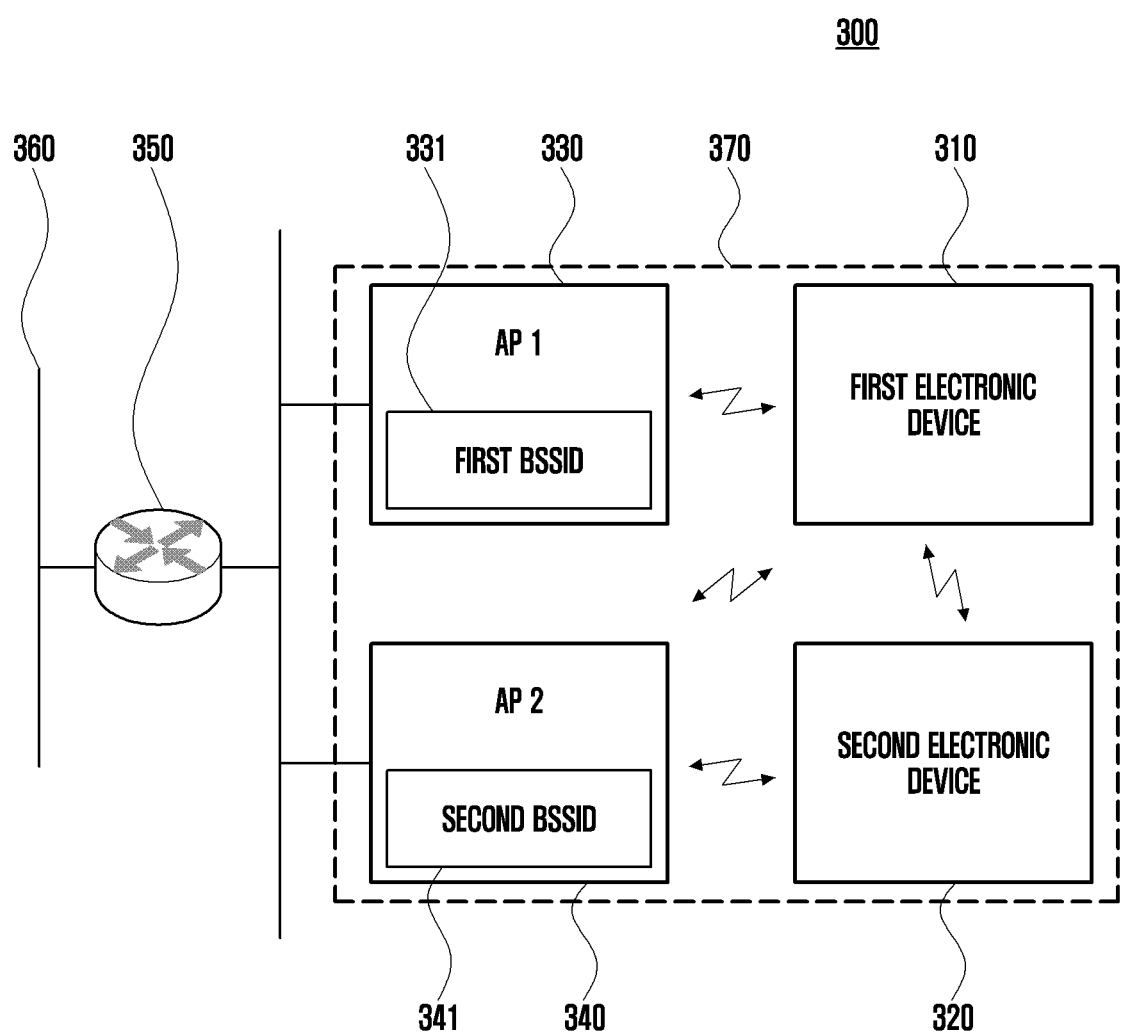
FIG. 3 is a diagram illustrating a first wireless local area network (WLAN) according to various embodiments of the disclosure.

FIG. 3 is a diagram illustrating a first wireless local area network (WLAN) 300 according to various embodiments of the disclosure. Referring to FIG. 3, in an embodiment, the first WLAN 300 may include a first electronic device 310 (e.g., the electronic device 101 in FIG. 1 or the electronic device 200 in FIG. 2), a second electronic device 320 (e.g., the electronic device 102 in FIG. 1), a first access point (AP) 330, and a second AP 340. The first electronic device 310 and/or the second electronic device 320 may have substantially the same configuration as that of at least one of the configurations of the electronic device 101 in FIG. 1 or the electronic device 200 in FIG. 2. The first electronic device 310 and the second electronic device 320 may be named a first station 310 and a second station 320, respectively. The APs 330 and 340 may be connected to an external network 360 (e.g., a cellular network, the Internet, or another LAN) through a router 350. The APs 330 and 340 may support data transmission or reception between the electronic devices 310 and 320 and the external network 360 through the router 350. The APs 330 and 340 may support data transmission or reception between the electronic devices 310 and 320. The APs 330 and 340 may have different basic service set identifiers (BSSIDs), respectively, and may configure one extended service set (ESS) 370 to recognize a state of connection between the electronic devices 310 and 320 and the APs. For example, the first electronic device 310 may be in a state of connection to the first AP 330, and the second electronic device 320 may be in a state of connection to the second AP 340. State information (e.g., a routing table) may be shared between the first AP 330 and the second AP 340. For example, the first AP 330 and the second AP 340 may share the state information through the router 350 by wire. Alternatively, the first AP 330 and the second AP 340 may share the state information through a wireless communication. In an embodiment, the APs 330 and 340 may support different frequency bands. For example, the first AP 330 may support a wireless communication channel within the 2.4 GHz band, and the second AP 340 may support a wireless communication channel within the 5 GHz band. In another embodiment, the APs 330 and 340 may support the same frequency band.

According to various embodiments, the APs 330 and 340 may support a process (e.g., a TDLS session) of establishing a communication between the electronic devices 310 and 320 so that the electronic devices 310 and 320 directly transmit or receive data to or from each other without involvement of the APs 330 and 340.

According to an embodiment, the second electronic device 320 may transmit (e.g., broadcast) a first request message for direct communication with the first electronic device 310. For example, if traffic moved between the first electronic device 310 and the second electronic device 320 (e.g., the wireless communication circuit 230 or the processor 240) through an AP (e.g., the APs 330 and 340) exceeds a predetermined threshold, the second electronic device may transmit a first request message. The first request message may include a header and a payload following IEEE 802.11 standards. The header may include: an ID (e.g., a MAC address) of the second electronic device 320, which is the device that transmitted the first request message; an ID of an entity to receive the first request message, for example, the first electronic device 310; and an ID (e.g., a second BSSID 341 (e.g., a MAC address)) of an AP connected to the second electronic device 320, for example, the second AP 340. A link identifier in a TDLS discovery request frame of the payload may include: an ID of the second electronic device 320, which is a device (initiator) that has requested a TDLS; an ID of an entity (responder) to respond to the TDLS request, for example, the first electronic device 310; and an ID (e.g., the second BSSID 341) of an AP connected to the initiator through a wireless communication channel, for example, the second AP 340.

According to an embodiment, the second AP 340 may identify the ID of the responder from the received first request message, and may determine that the responder (e.g., the first electronic device 310) is connected to the first AP 330 rather than the second AP 340. Based on the determination, the second AP 340 may transmit (e.g., wirelessly or wiredly transmit) the first request message to the first AP 330. For example, the header of the first request message transmitted to the first AP 330 may include an ID (e.g., a first BSSID 331) of the first AP 330 as an entity to receive the first request message.

According to an embodiment, the first AP 330 may identify the ID of the responder from the first request message received from the second AP 340, and may recognize that the responder (e.g., the first electronic device 310) is connected to the first AP itself. According to the recognition, the first AP 330 may transmit the first request message to the first electronic device 310.

According to various embodiments, the first electronic device 310 may identify an ID (e.g., the second BSSID 341) of an AP connected to the initiator from the TDLS discovery request frame of the first request message received from the first AP 330, and may recognize that the identified ID is different from "an ID (e.g., the first BSSID 331) of an AP (e.g., the first AP 330) connected to the first electronic device 310". Accordingly, the first electronic device 310 may perform a process of establishing a connection with an AP (e.g., the second AP 340) connected to the initiator. After completing a connection with the second AP 340, the first electronic device 310 may transmit (e.g., broadcast) a second request message for direct communication with the second electronic device 320. A TDLS discovery request frame of the second request message may include, for example: an ID of the first electronic device 310 as a device (initiator) that has requested a TDLS; an ID of an entity (responder) to respond to the TDLS request, for example, the second electronic device 320; and an ID (e.g., the second BSSID 341) of an AP connected to the initiator, for example, the second AP 340. The first electronic device 310 may perform a TDLS session with the second electronic device 320 through the second AP 340, based on reception of a response message (e.g., a TDLS discovery response frame) from the second electronic device 320. After the TDLS session is established, the first electronic device 310 may perform data transmission or reception with the second electronic device 320 without going through the second AP 340.

Figure 4:
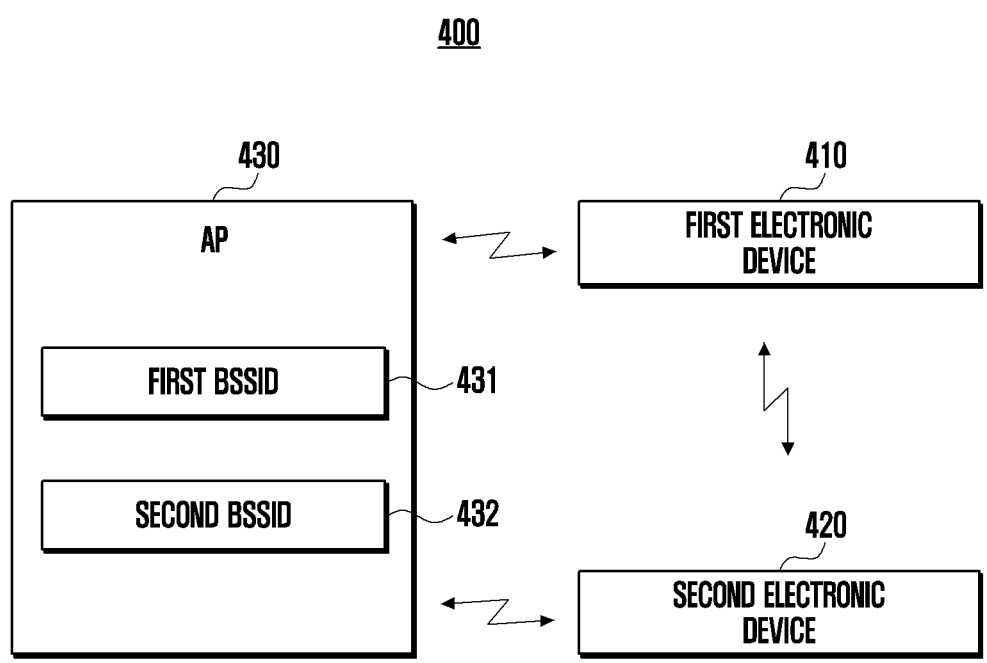
FIG. 4 is a diagram illustrating a second WLAN according to various embodiments of the disclosure.

FIG. 4 is a diagram illustrating a second WLAN 400 according to various embodiments of the disclosure. A description of the elements overlapping with those illustrated in FIG. 3 will be omitted or briefly given. Referring to FIG. 4, in an embodiment, the second WLAN 400 may include a first electronic device 410 (e.g., the electronic device 101 in FIG. 1 or the electronic device 200 in FIG. 2), a second electronic device 420 (e.g., the electronic device 102 in FIG. 1), and an AP 430. The first electronic device 410 and the second electronic device 420 may be named a first station 410 and a second station 420, respectively. The AP 430 may support multibands, and may have BSSIDs corresponding to each of frequency bands. For example, the AP 430 may have a first BSSID 431 corresponding to a first frequency band (e.g., 2.4 GHz) and a second BSSID 432 corresponding to a second frequency band (e.g., 5 GHz). The AP 430 may be connected to the first electronic device 410 by assigning the first BSSID 431 to the first electronic device 410, and may be connected to the second electronic device 420 by assigning the second BSSID 432 to the second electronic device 420.

According to various embodiments, the AP 430 may support a process (e.g., a TDLS session) of connecting the electronic devices 410 and 420 to each other so that the electronic devices 410 and 420 directly transmit or receive data to or from each other.

According to an embodiment, the second electronic device 420 may transmit a first request message for direct communication with the first electronic device 410. For example, the second electronic device 420 may transmit the first request message to the AP 430 through a wireless communication channel (hereinafter, a second channel) within the second frequency band, established between the AP 430 and the second electronic device. A TDLS discovery request frame of the first request message may include: an ID of the second electronic device 320 as a device (initiator) that has requested a TDLS; an ID of an entity (responder) to respond to the TDLS, for example, the first electronic device 310; and the second BSSID 432 corresponding to the second channel.

According to an embodiment, the AP 430 may receive the first request message through the second channel, may identify the ID of the responder from the first request message, and may recognize that the AP is connected to the responder (e.g., the first electronic device 410) through a wireless communication channel (hereinafter, a first channel) within the first frequency band. According to the recognition, the AP 430 may transmit the first request message to the first electronic device 410 through the first channel.

According to various embodiments, the first electronic device 410 may receive the first request message from the AP 430 through the first channel. The first electronic device 410 may identify a BSSID (e.g., the second BSSID 432) from the TDLS discovery request frame of the first request message, and may recognize that "a BSSID corresponding to the second channel established for the initiator" is different from "a BSSID (e.g., the first BSSID 431) corresponding to the first channel established between the first electronic device 410 and the AP 430". Accordingly, the first electronic device 410 may perform a process of establishing a connection with the AP 430 through the second channel. For example, if the first electronic device 410 can communicate with the AP 430 through the second channel, the first electronic device may scan wireless communication channels supported by the AP 430 to find the second channel. After completing a connection with the AP 430 through the second channel, the first electronic device 410 may transmit (e.g., broadcast) a second request message for direct communication with the second electronic device 420. A TDLS discovery request frame of the second request message may include, for example: an ID of the first electronic device 410 as a device (initiator) that has requested a TDLS; an ID of an entity (responder) to respond to the TDLS, for example, the second electronic device 420; and the second BSSID 432 corresponding to the second channel. The first electronic device 410 may perform a TDLS session with the second electronic device 420 through the second channel, based on reception of a response message (e.g., a TDLS discovery response frame) from the second electronic device 420. After the TDLS session is established, the first electronic device 410 may perform data transmission or reception with the second electronic device 420 through the second channel without going through the AP 430.

Figure 5:
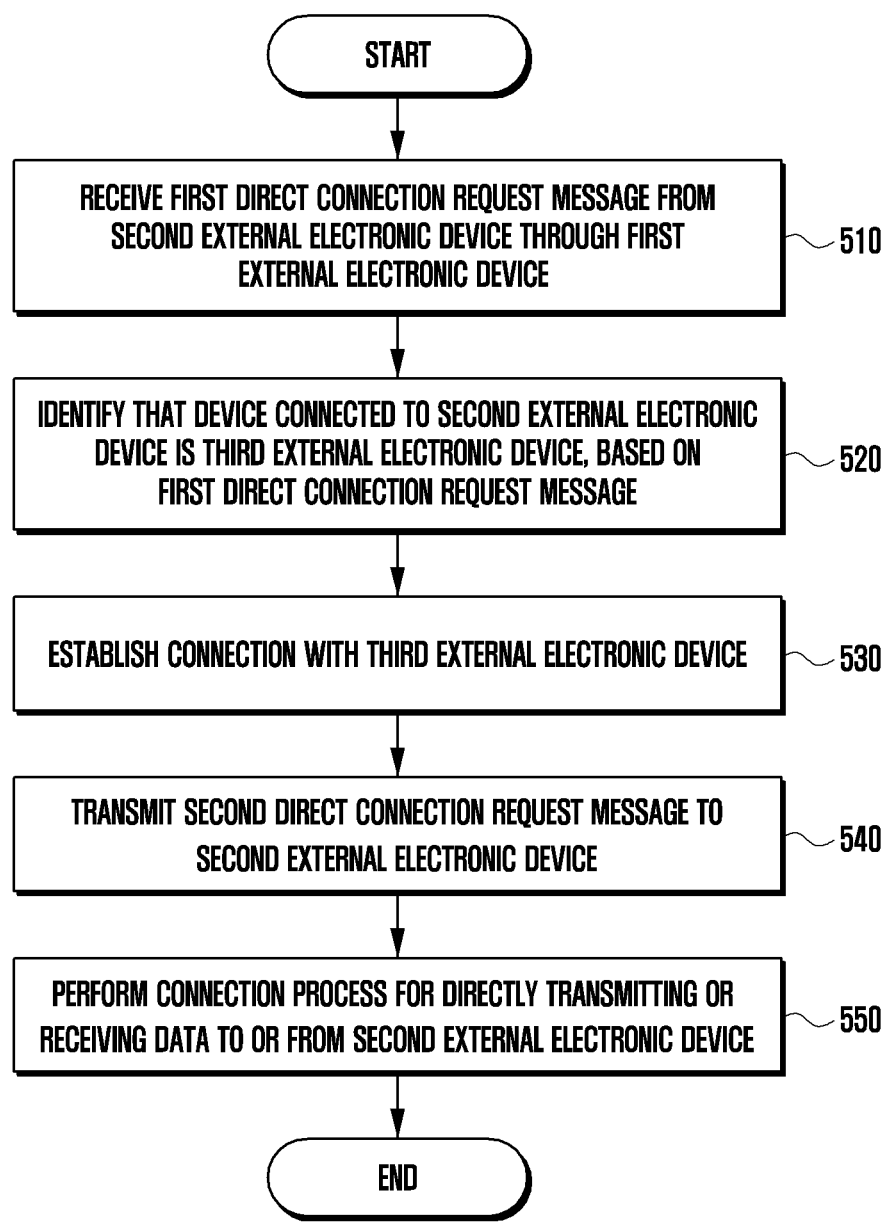
FIG. 5 illustrates operations in which an electronic device according to various embodiments of the disclosure establishes a connection with an external electronic device so as to directly transmit or receive data to or from the external electronic device.

FIG. 5 illustrates operations 500 in which an electronic device according to various embodiments of the disclosure establishes a connection with an external electronic device so as to directly transmit or receive data to or from the external electronic device. The operations 500 may be performed by the electronic device 101 in FIG. 1, the electronic device 200 in FIG. 2, the first electronic device 310 in FIG. 3, or the first electronic device 410 in FIG. 4.

According to various embodiments, in operation 510, an electronic device may receive a first direct connection request message from a second external electronic device (e.g., the electronic device 102 in FIG. 1, the second electronic device 320 in FIG. 3, or the second electronic device 420 in FIG. 4) through a first external electronic device (e.g., the first AP 330 in FIG. 3 or the AP 430 in FIG. 4) by using a wireless communication circuit (e.g., the wireless communication circuit 230 in FIG. 2). For example, the first direct connection request message may include a TDLS discovery request frame defined by IEEE 802.11z standards.

According to various embodiments, in operation 520, the electronic device may identify that a device connected to the second external electronic device through a wireless communication channel is a third external electronic device rather than the first external electronic device, based on the first direct connection request message. For example, the electronic device may identify a BSSID from the TDLS discovery request frame of the direct connection request message. The electronic device may recognize that the identified BSSID is different from "a BSSID of a device connected to the electronic device". According to an embodiment, the first external electronic device and the third external electronic device may be the first AP 330 and the second AP 340 illustrated in FIG. 3, respectively. For example, the electronic device may be in a state of connection to the first AP 330, and the second external electronic device may be in a state of connection to the second AP 340. Accordingly, the BSSID of the device connected to the electronic device may differ from the BSSID of the device connected to the second external electronic device. According to another embodiment, the first external electronic device and the third external electronic device may be physically a single device, but may have different BSSIDs. For example, the first external electronic device and the third external electronic device may be one physically integrated device supporting multibands, for example, may be the AP 430 illustrated in FIG. 4. For example, the electronic device may be in a state of connection to the AP 430 through a first wireless communication channel (e.g., a wireless communication channel within a 2.4 GHz band), and the second external electronic device may be in a state of connection to the AP 430 through a second wireless communication channel (e.g., a wireless communication channel within a 5 GHz band). The BSSID assigned to the electronic device may be the first BSSID 431 in FIG. 4, and the BSSID assigned to the second external electronic device may be the second BSSID 432 in FIG. 4.

According to various embodiments, in operation 530, the electronic device may perform a process of establishing a connection with the third external electronic device, by using a wireless communication circuit (e.g., the wireless communication circuit 230 in FIG. 2). According to an embodiment, the electronic device may recognize that the third external electronic device is connectable through a wireless medium. For example, a profile (e.g., BSSID information related to the second AP 340 in FIG. 3 or the AP 430 in FIG. 4) of the third external electronic device may be stored in the electronic device, and the electronic device may recognize, through the profile, that the third external electronic device has previously been connected to the electronic device through a wireless medium, and is currently connectable. The electronic device may establish a connection with the third external electronic device.

According to various embodiments, in operation 540, after a connection with the third external electronic device is established, the electronic device may transmit a second direct connection request message to the second external electronic device through the third external electronic device by using a wireless communication circuit (e.g., the wireless communication circuit 230 in FIG. 2). A BSSID field in a TDLS discovery request frame of the second direct connection request message may include an ID (e.g., the BSSID of the second AP 340 in FIG. 3 or the second BSSID 432 in FIG. 4) of the third external electronic device.

According to various embodiments, in operation 550, the electronic device may perform a connection process (e.g., a TDLS process) for directly transmitting or receiving data to or from the second external electronic device, through the third external electronic device by using a wireless communication circuit (e.g., the wireless communication circuit 230 in FIG. 2), based on reception of a direct connection response message from the second external electronic device. After completing a connection with the second external electronic device, the electronic device may directly transmit or receive data to or from the second external electronic device without going through the third external electronic device.

FIG. 6 illustrates operations 600 for establishing a TDLS session in a WLAN according to various embodiments of the disclosure. The operations 600 according to various embodiments may be performed in a WLAN including a first electronic device 601, a second electronic device 602, a first AP 603, and a second AP 604. The first electronic device 601 and the second electronic device 602 may be named a first station 601 and a second station 602, respectively. Before initial operation 605 is performed among the following operations 600, the first electronic device 601 may be in a state of connection to the first AP 603, and the second electronic device 602 may be in a state of connection to the second AP 604. According to an embodiment, the first electronic device 601, the second electronic device 602, the first AP 603, and the second AP 604 may correspond to the first electronic device 310, the second electronic device 320, the first AP 330, and the second AP 340 illustrated in FIG. 3, respectively. According to another embodiment, the first electronic device 601 and the second electronic device 602 may correspond to the first electronic device 410 and the second electronic device 420 illustrated in FIG. 4, respectively. The first AP 603 and the second AP 604 may be the AP 430 in FIG. 4, which is physically integrated.

According to various embodiments, in operation 605, the second electronic device 602 may transmit a TDLS discovery request frame for establishing a TDLS session with the first electronic device 601, to the second AP 604. For example, the TDLS discovery request frame transmitted to the second AP 604 may include: an ID of the second electronic device 602 as a device (initiator) that has requested a TDLS; an ID of an entity (responder) to respond to the TDLS request, for example, the first electronic device 601; and an ID (e.g., a BSSID) of an AP connected to the initiator through a wireless communication channel, for example, the second AP 604.

According to various embodiments, the second AP 604 may identify a TDLS responder field of the TDLS discovery request frame received from the second electronic device 602, to recognize that a recipient of the TDLS discovery request frame is the first electronic device 601, and may recognize that the first electronic device 601 is connected to the first AP 603, through a routing table stored in a memory of the second AP 604. Accordingly, in operation 606, the second AP 604 may transmit the TDLS discovery request frame to the first AP 603.

According to various embodiments, in operation 607, the first AP 603 may transmit the TDLS discovery request frame to the first electronic device 601.

According to various embodiments, the first electronic device 601 may identify a BSSID field of the received TDLS discovery request frame to recognize that the second electronic device 602 is connected to a different AP rather than the first AP 603.

According to various embodiments, in operation 608, the first electronic device 601 may perform an operation of establishing a connection with the second AP 604. According to an embodiment, the first electronic device 601 may fully scan all the wireless communication channels supported by the second AP 604 to identify a wireless communication channel which can be established between the second AP 604 and the first electronic device. According to an embodiment, the first electronic device 601 may recognize, through connection history information, that the different AP (i.e., the second AP 604) has previously been connected to the first electronic device, and may scan (called partial scan) only the wireless communication channels that have previously been established, to identify a wireless communication channel which can be established between the second AP 604 and the first electronic device. A connection between the first electronic device 601 and the second AP 604 may be finished through a process including the procedures in which: the first electronic device 601 transmits a probe request to the second AP 604 through the identified wireless communication channel; the second AP 604 transmits a probe response to the first electronic device 601; the first electronic device 601 transmits an association request to the second AP 604; and the second AP 604 transmits an association response to the first electronic device 601.

According to various embodiments, after completing a connection with the second AP 604 (e.g., after an association response is received by the first electronic device 601 from the second AP 604), in operation 609, the first electronic device 601 may transmit a TDLS discovery request frame for establishing a TDLS session with the second electronic device 602, to the second AP 604. For example, the TDLS discovery request frame transmitted to the second AP 604 may include: an ID of the first electronic device 601 as a device (initiator) that has requested a TDLS; an ID of an entity (responder) to respond to the TDLS request, for example, the second electronic device 602; and an ID (e.g., a BSSID) of an AP connected to the initiator through a wireless communication channel, for example, the second AP 604.

According to various embodiments, the second AP 604 may identify a TDLS responder field of the TDLS discovery request frame received from the first electronic device 601, to recognize that a recipient of the TDLS discovery request frame is the second electronic device 602, and accordingly, in operation 610, the second AP 604 may transmit the TDLS discovery request frame to the second electronic device 602.

According to various embodiments, the second electronic device 602 may identify a BSSID field of the TDLS discovery request frame received from the second AP 604, to recognize that the first electronic device 601 is connected to the second AP 604, which is identical to the device connected to the second electronic device 602. According to an embodiment, in operation 611, the second electronic device 602 may transmit a TDLS discovery response frame to the first electronic device 601 without going through the second AP 604.

According to various embodiments, in operation 612, the first electronic device 601 may perform a TDLS session with the second electronic device 602 through the second AP 604. For example, the TDLS session may be finished through a process including the procedures in which: the first electronic device 601 transmits a TDLS request to the second electronic device 602 through the second AP 604, based on reception of the TDLS discovery response frame from the second station 602; the second electronic device 602 transmits a TDLS response to the first electronic device 601 through the second AP 604; and the first electronic device 601 transmits a TDLS setup confirmation to the second electronic device 602 through the second AP 604.

According to various embodiment, an electronic device (e.g., the electronic device 200 in FIG. 2) may include: at least one wireless communication circuit (e.g., the wireless communication circuit 230 in FIG. 2) configured to transmit or receive a wireless signal according to IEEE 802.11 standards; a processor (e.g., the processor 240 in FIG. 2) operatively connected to the wireless communication circuit; and a memory (e.g., the memory 250 in FIG. 2) operatively connected to the processor, wherein the memory stores instructions which, when executed, cause the processor to: receive a first request message for a tunneled direct link setup (TDLS) session defined by IEEE 802.11 standards, from a first access point (AP) through the wireless communication circuit; based on the first request message, determine that an external electronic device that has requested the TDLS session is connected to a second AP; based on the determination, establish a connection with the second AP through the wireless communication circuit; transmit a second request message for the TDLS session to the second AP; and based on reception of a response message on the second request message from the external electronic device, establish the TDLS session with the external electronic device through the second AP.

According to various embodiments, the instructions may cause the processor to: identify a basic service set identifier (BSSID) from a TDLS discovery request frame of the first request message; and based on the identified BSSID, determine the second AP connected to the external electronic device. The identified BSSID may include a MAC address of the second AP.

According to various embodiments, the first AP may have a first BSSID (e.g., the first BSSID 331 in FIG. 3 or the first BSSID 431 in FIG. 4) corresponding to a first frequency band, and the second AP may have a second BSSID (e.g., the second BSSID 332 in FIG. 3 or the second BSSID 432 in FIG. 4) corresponding to a second frequency band different from the first frequency band, and the instructions may cause the processor to: identify a basic service set identifier (BSSID) from a TDLS discovery request frame of the first request message; and if the identified BSSID is the second BSSID, establish a connection with the second AP through a wireless communication channel within the second frequency band. One of the first frequency band and the second frequency band may include a frequency of 2.4 GHz, and a remaining one may include a frequency of 5 GHz.

According to various embodiments, the instructions may cause the processor to: scan at least one wireless communication channel by using the wireless communication circuit to identify a wireless communication channel which can be established with the second AP; and establish a connection with the second AP through the identified wireless communication channel.

According to various embodiments, the memory may be configured to store connection history information relating to connection with at least one AP, and the instructions may cause the processor to, if a history related to connection between the second AP and the electronic device exists in the connection history information, determine the second AP as a connectable AP.

According to various embodiments, a method for operating an electronic device (e.g., the electronic device 200 in FIG. 2) may include: receiving a first request message for a tunneled direct link setup (TDLS) session defined by IEEE 802.11 standards, from a first access point (AP); based on the first request message, determining that an external electronic device that has requested the TDLS session is connected to a second AP; based on the determination, establishing a connection with the second AP through a wireless communication channel; transmitting a second request message for the TDLS session with the external electronic device to the second AP; and based on reception of a response message on the second request message from the external electronic device, establishing the TDLS session with the external electronic device through the second AP.

According to various embodiments, the determining may include:

identifying a basic service set identifier (BSSID) from a TDLS discovery request frame of the first request message; and based on the identified BSSID, determining the second AP connected to the external electronic device. The identified BSSID may include a MAC address of the second AP.

According to various embodiments, the first AP may have a first BSSID (e.g., the first BSSID 331 in FIG. 3 or the first BSSID 431 in FIG. 4) corresponding to a first frequency band, and the second AP may have a second BSSID (e.g., the second BSSID 332 in FIG. 3 or the second BSSID 432 in FIG. 4) corresponding to a second frequency band different from the first frequency band, and the establishing of the connection with the second AP may include, if a BSSID identified from a TDLS discovery request frame of the first request message is the second BSSID, establishing a connection with the second AP through a wireless communication channel within the second frequency band. One of the first frequency band and the second frequency band may include a frequency of 2.4 GHz, and a remaining one may include a frequency of 5 GHz.

According to various embodiments, the establishing of the connection with the second AP may include: scanning at least one wireless communication channel supported by the second AP to identify a wireless communication channel which can be established with the second AP; and establishing a connection with the second AP through the identified wireless communication channel.

According to various embodiments, the electronic device may store history information related to connection with at least one AP in a memory, and the method may further include, if a history related to connection between the second AP and the electronic device exists based on the history information, determining the second AP as a connectable AP.

According to various embodiments, an electronic device (e.g., the electronic device 200 in FIG. 2) may include: at least one wireless communication circuit (e.g., the wireless communication circuit 230 in FIG. 2) configured to transmit or receive a wireless signal according to IEEE 802.11 standards; and a processor (e.g., the processor 240 in FIG. 2) operatively connected to the wireless communication circuit and configured to transmit or receive data to or from another electronic device through the wireless communication circuit, wherein the processor is configured to: establish a connection with an access point (AP) (e.g., the AP 430 in FIG. 4) through the wireless communication circuit by using a first basic service set identifier (BSSID) (e.g., the first BSSID 431 in FIG. 4) of the AP; receive a first direct connection request message of an external electronic device through the AP; based on the first direct connection request message, determine that connection between the external electronic device and the AP is based on a second BSSID (e.g., the second BSSID 432 in FIG. 4) of the AP; based on the determination, establish a connection with the AP through the wireless communication circuit by using the second BSSID; transmit a second direct connection request message to the external electronic device through the AP; in response to reception of a response message on the second direct connection request message from the external electronic device, establish a connection with the external electronic device; and transmit or receive data to or from the external electronic device without going through the AP.

According to various embodiments, the response message may be received by the electronic device from the external electronic device without going through the AP.

According to various embodiments, the processor may be configured to: scan at least one wireless communication channel supported by the AP to identify a channel corresponding to the second BSSID; and establish a connection with the AP through the identified wireless communication channel.

According to various embodiments, the AP may support a first wireless communication channel within a first frequency band and a second wireless communication channel within a second frequency band different from the first frequency band, and the processor may be configured to, if it is determined that the external electronic device is connected to the AP through the second wireless communication channel, establish a connection with the AP through the second wireless communication channel. One of the first frequency band and the second frequency band may include a frequency of 2.4 GHz, and a remaining one may include a frequency of 5 GHz.

According to various embodiments, the first direct connection request message may include identification information of the external electronic device as a requester for direct connection, identification information of the AP connected to the requester through a wireless communication channel, and identification information of the electronic device, and the processor may be configured to, if it is identified that the identification information of the AP corresponds to the second BSSID rather than the first BSSID, establish a connection with the AP, based on the second BSSID.

The embodiments of the disclosure described and shown in the specification and the drawings have presented specific examples in order to easily explain the technical contents of embodiments of the disclosure and help understanding of embodiments of the disclosure, and are not intended to limit the scope of embodiments of the disclosure. Therefore, the scope of various embodiments of the disclosure should be construed to include, in addition to the embodiments disclosed herein, all changes and modifications that are derived on the basis of the technical idea of various embodiments of the disclosure.

The invention claimed is:

1. An electronic device comprising:
at least one wireless communication circuit configured to transmit or receive a wireless signal according to IEEE 802.11 standards;
a processor operatively connected to the wireless communication circuit; and
a memory operatively connected to the processor,
wherein the memory stores instructions which, when executed, cause the processor to:
receive a first request message for a tunneled direct link setup (TDLS) session defined by IEEE 802.11 standards, from a first access point (AP) through the wireless communication circuit;
based on the first request message, determine that an external electronic device that has requested the TDLS session is connected to a second AP;
based on the determination, establish a connection with the second AP through the wireless communication circuit;
transmit a second request message for the TDLS session to the second AP; and
based on reception of a response message on the second request message from the external electronic device, establish the TDLS session with the external electronic device through the second AP.

2. The electronic device of claim 1, wherein the instructions cause the processor to:
identify a basic service set identifier (BSSID) from a TDLS discovery request frame of the first request message; and
based on the identified BSSID, determine the second AP connected to the external electronic device.

3. The electronic device of claim 2, wherein the identified BSSID comprises a MAC address of the second AP.

4. The electronic device of claim 1, wherein the first AP has a first BSSID corresponding to a first frequency band, and the second AP has a second BSSID corresponding to a second frequency band different from the first frequency band, and wherein the instructions cause the processor to:
identify a basic service set identifier (BSSID) from a TDLS discovery request frame of the first request message; and
if the identified BSSID is the second BSSID, establish a connection with the second AP through a wireless communication channel within the second frequency band.

5. The electronic device of claim 4, wherein one of the first frequency band and the second frequency band comprises a frequency of 2.4 GHz, and a remaining one comprises a frequency of 5 GHz.

6. The electronic device of claim 1, wherein the instructions cause the processor to:
scan at least one wireless communication channel by using the wireless communication circuit to identify a wireless communication channel which can be established with the second AP; and
establish a connection with the second AP through the identified wireless communication channel.

7. The electronic device of claim 1, wherein the memory is configured to store connection history information relating to connection with at least one AP, and
wherein the instructions cause the processor to, if a history related to connection between the second AP and the electronic device exists in the connection history information, determine the second AP as a connectable AP.

8. A method for operating an electronic device, the method comprising:
receiving a first request message for a tunneled direct link setup (TDLS) session defined by IEEE 802.11 standards, from a first access point (AP);
based on the first request message, determining that an external electronic device that has requested the TDLS session is connected to a second AP;
based on the determination, establishing a connection with the second AP through a wireless communication channel;
transmitting a second request message for the TDLS session with the external electronic device to the second AP; and
based on reception of a response message on the second request message from the external electronic device, establishing the TDLS session with the external electronic device through the second AP.

9. The method of claim 8, wherein the determining comprises:
identifying a basic service set identifier (BSSID) from a TDLS discovery request frame of the first request message; and
based on the identified BSSID, determining the second AP connected to the external electronic device.

10. An electronic device comprising:
at least one wireless communication circuit configured to transmit or receive a wireless signal according to IEEE 802.11 standards; and
a processor operatively connected to the wireless communication circuit and configured to transmit or receive data to or from another electronic device through the wireless communication circuit,
wherein the processor is configured to:
establish a connection with an access point (AP) through the wireless communication circuit by using a first basic service set identifier (BSSID) of the AP;
receive a first direct connection request message of an external electronic device through the AP;
based on the first direct connection request message, determine that connection between the external electronic device and the AP is based on a second BSSID of the AP;
based on the determination, establish a connection with the AP through the wireless communication circuit by using the second BSSID;
transmit a second direct connection request message to the external electronic device through the AP;
in response to reception of a response message on the second direct connection request message from the external electronic device, establish a connection with the external electronic device; and
transmit or receive data to or from the external electronic device without going through the AP.

11. The electronic device of claim 10, wherein the response message is configured to be received by the electronic device from the external electronic device without going through the AP.

12. The electronic device of claim 10, wherein the processor is configured to:
scan at least one wireless communication channel supported by the AP to identify a channel corresponding to the second BSSID; and
establish a connection with the AP through the identified wireless communication channel.

13. The electronic device of claim 10, wherein the AP supports a first wireless communication channel within a first frequency band and a second wireless communication channel within a second frequency band different from the first frequency band, and
wherein the processor is configured to, if it is determined that the external electronic device is connected to the AP through the second wireless communication channel, establish a connection with the AP through the second wireless communication channel.

14. The electronic device of claim 13, wherein one of the first frequency band and the second frequency band comprises a frequency of 2.4 GHz, and a remaining one comprises a frequency of 5 GHz.

15. The electronic device of claim 10, wherein the first direct connection request message comprises identification information of the external electronic device as a requester for direct connection, identification information of the AP connected to the requester through a wireless communication channel, and identification information of the electronic device, and
wherein the processor is configured to, if it is identified that the identification information of the AP corresponds to the second BSSID rather than the first BSSID, establish a connection with the AP, based on the second BSSID.

* * * * *